United States Patent [19]
White et al.

[11] Patent Number: 5,645,700
[45] Date of Patent: Jul. 8, 1997

[54] POLYMER MEMBRANE BASED ELECTROLYTIC CELL AND PROCESS FOR THE DIRECT GENERATION OF HYDROGEN PEROXIDE IN LIQUID STREAMS

[75] Inventors: James H. White; Michael Schwartz; Anthony F. Sammells, all of Boulder, Colo.

[73] Assignee: Eltron Research, Inc., Boulder, Colo.

[21] Appl. No.: 366,292

[22] Filed: Dec. 28, 1994

[51] Int. Cl.$^6$ .................. C25B 9/00; C25C 7/00; C25D 17/00

[52] U.S. Cl. ................ 204/252; 204/257; 204/258; 204/263; 204/265; 204/266

[58] Field of Search .................. 204/59 R, 84, 204/252, 257, 258, 263, 265, 266

[56] References Cited

U.S. PATENT DOCUMENTS

| | | |
|---|---|---|
| 4,455,203 | 6/1984 | Stucki ........................ 204/84 |
| 4,545,886 | 10/1985 | de Nora et al. ............. 204/265 |

OTHER PUBLICATIONS

Otsuka et al., "One Step Synthesis of Hydrogen Peroxide Through Cell Reaction", *Electrochimica Acta*, 35(2), Feb. 1990, pp. 319–322.

*Primary Examiner*—Kathryn Gorgos
*Assistant Examiner*—Edna Wang
*Attorney, Agent, or Firm*—Greenlee, Winner and Sullivan, P.C.

[57] ABSTRACT

An electrolytic cell for generating hydrogen peroxide is provided including a cathode containing a catalyst for the reduction of oxygen, and an anode containing a catalyst for the oxidation of water. A polymer membrane, semipermeable to either protons or hydroxide ions is also included and has a first face interfacing to the cathode and a second face interfacing to the anode so that when a stream of water containing dissolved oxygen or oxygen bubbles is passed over the cathode and a stream of water is passed over the anode, and an electric current is passed between the anode and the cathode, hydrogen peroxide is generated at the cathode and oxygen is generated at the anode.

9 Claims, 2 Drawing Sheets

POLYMER MEMBRANE BASED ELECTROLYTIC CELL AND PROCESS FOR THE DIRECT GENERATION OF HYDROGEN PEROXIDE IN LIQUID STREAMS

This invention was made with United States government support under contract number NAS9-19275 awarded by NASA. The United States government has certain rights in this invention.

TECHNICAL FIELD

This invention relates to an apparatus and method for the generation of hydrogen peroxide in streams of liquid from air or oxygen by direct oxygen reduction at a cathode interfaced directly to a polymer electrolyte membrane in an electrolytic cell. The process and device can be used to generate hydrogen peroxide on-demand for the purposes of water purification, remediation, or chemical synthesis.

BACKGROUND ART

Electrochemical methods for the generation of hydrogen peroxide have been previously developed, studied, and used. Hydrogen peroxide is currently used in chemical synthesis, treatment of wastewater, or remediation of ground water. With present methods, the hydrogen peroxide is produced by the expensive anthraquinone process and subsequently shipped to the point of use. No known approach permits hydrogen peroxide to be produced on-site without the need for acids and additional materials. Hydrogen peroxide must therefore be stored and shipped to sites for use, causing safety and time problems as well as undue expense.

Hydrogen peroxide is currently produced by reducing anthraquinone to anthrahydroquinone using hydrogen, followed by its air oxidation back to anthraquinone. In this process, the oxygen is reduced to hydrogen peroxide. This approach does not permit hydrogen peroxide to be generated directly into liquid streams because the direct contact between oxygen and anthrahydroquinone phase contaminates the hydrogen peroxide with the quinone and its degradation and oxidation products. Consequently, present methods of hydrogen peroxide production produce bulk quantities of the chemical which are subsequently shipped to and stored by the hydrogen peroxide user. This leads to substantial expenses for transportation and storage. Direct generation in the liquid stream of concern would eliminate the time and expense of storage and transportation, as well as eliminating associated hazards.

Electrochemical methods currently proposed for the generation of hydrogen peroxide include hydrogen/oxygen fuel cells, dual electrolytic membrane cells, and trickle bed reactors. Details of these approaches will become more apparent in the following discussion of prior art.

Previously used approaches have employed $H^+$ conducting membranes in a fuel cell configuration, in which oxygen is reduced on the cathode side and hydrogen oxidized on the anode side to supply protons. Other approaches have utilized electrolysis of peroxide ions produced in alkaline media into acid for neutralization and recovery of hydrogen peroxide.

In U.S. Pat. No. 4,758,317, to Chiang, a membrane permeable to hydroxyl ions was used to separate the anode and cathode of an electrolytic cell, in which hydrogen peroxide was generated. Oxygen evolved at the anode was used to feed the cathode. This method does not allow for the direct dispensation of hydrogen peroxide into the desired target liquid.

U.S. Pat. No. 4,753,718, also to Chiang, disclosed an electrolytic cell using an aqueous alkaline electrolyte and porous cathode and anode for generating hydrogen peroxide. Like U.S. Pat. No. 4,753,718, that invention requires access of cathode to air or oxygen gas, and alkaline electrolyte, which, in the absence of acidification of the electrolyte, does not efficiently utilize oxygen, since a portion of the oxygen is reduced to peroxide ion ($HO_2^-$) rather than hydrogen peroxide ($H_2O_2$).

U.S. Pat. No. 4,693,794, by Chiang, contained a prescription for an overall process utilizing aqueous alkaline electrolytes in one or several cells. As with U.S. Pat. Nos. 4,758,317 and 4,753,718, alkaline peroxide solutions must be neutralized with acid to collect all generated hydrogen peroxide and $H_2O_2$ precursor ($HO_2^-$). The acids required for neutralization are an additional expense and safety hazard. Additionally, alkaline media tend to absorb atmospheric $CO_2$ readily, resulting in clogging of electrodes and necessitating replenishment of the electrolyte and $CO_2$ free storage. Thus, U.S. Pat. Nos. 4,758,317, 4,753,718, and 4,693,794 have rigorous storage requirements.

U.S. Pat. Nos. 4,533,443 and 4,572,774, by Wrighton, et al. disclosed an indirect electrochemical means for generating hydrogen peroxide. The electro-chemical cell was used to reduce quinone anchored to high surface area support particles suspended in the electrolyte. The suspended particles were removed from the cell and reacted with oxygen to produce hydrogen peroxide. The oxidized anchored quinone was subsequently returned to the electrolytic cell for reduction. This approach requires considerable expense because of the cost of derivatized quinone, and its attachment to the support particles. Additionally, its usage in on-demand applications would be difficult because of the need to separate the supported quinone from water or other liquid streams.

U.S. Pat. No. 4,455,203, by Stucki, discloses an electrolytic process using a $OH^-$ or $H^+$ (proton) conducting solid electrolyte. The cell utilizes water or oxygen containing gas at the cathode to generate hydrogen peroxide. This approach utilizes solids, rather than polymer gels, as electrolyte resulting in the need for operation at above ambient temperatures and the absence of mechanical flexibility. Temperature limitations result in the cell being incapable of direct interfacing to a stream of water or other liquid to which hydrogen peroxide is supplied.

Another example of an aqueous alkaline electrolyte based electrolytic apparatus for generating hydrogen peroxide is that presented in U.S. Pat. No. 4,430,176, by Davison. That invention utilized a porous cathode into which oxygen and water could be circulated. Application of an electric current resulted in the generation of primarily peroxide ($HO_2^-$) ion in the alkaline medium. Again, acidification of the peroxide ion containing alkaline medium is necessary to recover hydrogen peroxide.

A method of electrolytically producing and neutralizing peroxide ion is described in U.S. Pat. No. 4,384,931, by Jasinski, et al. and U.S. Pat. No. 4,357,217, by Kuehn, et al. In either case, a three compartment electrochemical cell was used. Two of the compartments (center and anode) were separated by a proton conducting membrane and center and cathode compartments by an $OH^-$ conducting membrane. $H^+$ ions are produced at the anode and migrate across the $H^+$ permeable membrane to the center chamber containing aqueous alkaline electrolyte and peroxide ions generated at the cathode. The result is that peroxide ion is converted to hydrogen peroxide in the center well within a self-contained apparatus. The disadvantages of such an approach stems from the usual instability of anion conducting membranes and the presence of salts arising from neutralization of alkaline medium with acid.

Another method for preparing peroxide ions ($HO_2^-$) is found in U.S. Pat. No. 4,350,575, by Porta, et al. This approach utilized circulation of alkaline electrolyte at the cathode to produce hydrogen peroxide ions in a predetermined concentration. This peroxide ion containing catholyte is then discharged from the cell when the desired concentration level is attained. This approach introduces alkaline contaminants into the hydrogen peroxide collected, which prevents hydrogen peroxide from being dispensed directly into the liquid stream without prior purification.

A method using the reaction of metals with nitrogen and the generation of alkali peroxide is described in U.S. Pat. No. 4,254,090, by Radebold. The method generates alkali metal and alkali peroxide and subsequently reacts these species with nitrogen and water to generate hydrazine and hydrogen peroxide, respectively. The disadvantages of this approach in relation to the current invention stems from the high temperatures required and the noxious chemical species (alkali metal, alkali-peroxide, and hydrazine) evolved.

U.S. Pat. No. 4,067,787, to Kastening, et al. disclosed an electrochemical method of hydrogen peroxide manufacture utilizing an organic redox system in alkaline media. This approach is disadvantageous because of the need for acidification of the electrolyte and the presence of the dissolved organic system.

The process described in U.S. Pat. No. 3,884,777, by Harke, et al. simultaneously electrolytically produces hydrogen peroxide, chlorine dioxide, chlorine, alkali metal hydroxide, and hydrogen. Hydrogen peroxide is produced indirectly by action of pyrosulfuric acid on steam produced at the anode. This method is not directly applicable to direct introduction of hydrogen peroxide into liquid streams at the remote sites because of the several steps required and because of the presence of sulfuric acid in the effluent.

U.S. Pat. No. 5,112,702, by Berzins, et al. discloses an electrolytic hydrogen peroxide synthesis approach using an acidic electrolyte. The method produced hydrogen peroxide under conditions of controlled potential to enhance selectivity to $H_2O_2$. Additionally, the electrolyte medium contained halide ions, which tended to improve selectivity.

In addition to the previously discussed patent literature, several recent articles describe hydrogen peroxide synthesis in PEM based fuel cells (K. Otsuka and I. Yamanaka, Electrochimica Acta, 35, 1990 (319)) and electrolytic cells (P. Tatapudi and J. M. Fenton, J. Electrochem. Soc., 140, 1993 (L55); P. Tatapudi and J. M. Fenton, J. Electrochem. Soc., 141, 1994 (1174)). The former (fuel cell) approach utilized hydrogen at the anode of the cell to spontaneously reduce oxygen to $H_2O_2$ at the cathode. The latter approach was based on proton exchange membranes interfaced to teflon bonded oxygen reduction and ozone evolution catalysts on the cathode and anode sides, respectively. Oxygen was presented as a humidified stream to the cathode and deionized water to the anode, rather than having hydrogen peroxide be generated in a liquid stream or emulsion of gas and liquid. This poses the disadvantage of having to convert the liquid stream into vapor prior to introduction into the cell.

There is thus a need for an apparatus and method which would allow hydrogen peroxide to be continuously produced on-site without the need for acids and additional materials. The hydrogen peroxide should be produced in streams of liquid in a contaminant-free state, thereby eliminating the expense and hazards associated with storage and transportation of hydrogen peroxide.

DISCLOSURE OF THE INVENTION

In accordance with the present invention, an electrolytic cell for generating hydrogen peroxide is provided. The cell includes a cathode containing a catalyst for the reduction of oxygen, and an anode containing a catalyst for the oxidation of water. A polymer membrane, semipermeable to either protons or hydroxide ions is also included and has a first face interfacing to the cathode and a second face interfacing to the anode so that when a stream of water containing dissolved oxygen or oxygen bubbles is passed over the cathode and a stream of water is passed over the anode, and an electric current is passed between the anode and the cathode, hydrogen peroxide is generated at the cathode and oxygen is generated at the anode.

A generator having multiple electrolytic cells according to the current invention is also provided. A stream of water containing oxygen is delivered to and from each of the cells by use of a conduit system or similar arrangement. The cells are electrically connected in series so that when an electrical current is passed through the cells oxygen is reduced adjacent to the cathode of each cell, resulting in the generation of hydrogen peroxide in the water stream.

The present invention is a process utilizing a device that consists of a single proton or anion exchange membrane interfaced to catalysts and current collectors on both faces. The catalyst on one face (cathode) is active for the reduction of oxygen to hydrogen peroxide. The catalyst on the opposite face (anode) is active for the oxidation of water. Streams of liquid (water) are passed over both sides of the membrane. The stream on the cathode side contains dissolved or emulsified oxygen. Passage of current or the application of a constant voltage gives rise to electrochemical processes at the cathode and anode which produce hydrogen peroxide and oxygen, respectively:

$$O_2 + 2H^+ + 2e^- \rightarrow H_2O_2 \qquad (1)$$

The anode reaction is, correspondingly, $$H_2O \rightarrow \tfrac{1}{2}O_2 + 2H^+ + 2e^- \qquad (2)$$

The overall reaction is given by:

$$\tfrac{1}{2}O_2 + H_2O \rightarrow H_2O_2 \qquad (3)$$

Hydrogen peroxide formation involves the direct reduction of dioxygen ($O_2$) at the cathode surface. This surface must selectively reduce $O_2$ rather than dissociatively adsorbing dioxygen and producing a metal oxide or water as product. This product selectivity (to $H_2O_2$) is a function of the cathode electrocatalyst used and the nature of the ion exchange membrane (anion or cation conduction). Using proton conductors, the reactions alluded to previously are applicable. With anion ($OH^-$) conductors, the following apply to the cathode side:

$$O_2 + H_2O + 2e^- \rightleftharpoons HO_2^- + OH^- \qquad (4)$$

and $$O_2 + 2H_2O + 2e^- \rightleftharpoons H_2O_2 + 2OH^- \qquad (5)$$

The first equilibrium produces peroxide ($HO_2^-$) ions which are collected on the cathode side or are transported through the membrane under the action of the electric field (electrocatalysis). The $HO_2^-$ collected as such must then be titrated with acid to obtain $H_2O_2$. The corresponding anode reaction at anion ($OH^-$) conducting membranes is as follows:

$$2OH^- \rightleftharpoons H_2O + \tfrac{1}{2}O_2 + 2e^- \quad (6)$$

and the overall cell reactions are:

$$OH^- + \tfrac{1}{2}O_2 \rightleftharpoons HO_2^- \quad (7)$$

and $$H_2O + \tfrac{1}{2}O_2 \rightleftharpoons H_2O_2 \quad (8)$$

corresponding respectively to reactions (4) and (5).

Electrocatalysts that will be employed on the reducing side of the electrolytic cell for converting oxygen to hydrogen peroxide must catalyze the controlled (i.e. noncombustive) reaction between hydrogen and oxygen. These catalysts must reversibly (weakly and non dissociatively) bind dioxygen ($O_2$) and allow for the two electron reduction of $O_2$, as indicated previously in reactions (1), (4), and (5).

Electrocatalysts for oxidizing water or hydroxide ions to oxygen are incorporated into the anode, opposite the cathode. These catalysts share many of the properties of the oxygen reduction catalysts employed in the cathode. However, the anode catalysts must be able to bind $H_2O$ or $OH^-$, oxidize these species to bound oxygen atoms, and release oxygen to the surroundings.

The current collectors on either face may either incorporate the catalyst and be interfaced directly to the polymer membrane or may contact a catalyst deposited directly onto the membrane. The current collector and catalyst must be arranged so as to allow maximal access of reactant to the catalyst surfaces, while simultaneously allowing for ions to be removed or brought to reaction sites.

Liquid (water) streams will contact either side of the electrolytic cell. The stream containing oxygen and delivered to the cathode may be rendered into an oxygen containing state by dissolving the oxygen in the liquid stream or by emulsifying the liquid with oxygen gas.

The electrolytic cell may operate in a single cell configuration or as a number of single cells connected electrically in parallel or in series.

This invention will be discussed in greater detail in the description which follows. Additional advantages of the invention will become apparent from this discussion, together with accompanying drawings.

BEST MODE FOR CARRYING OUT THE INVENTION

Figure 1:
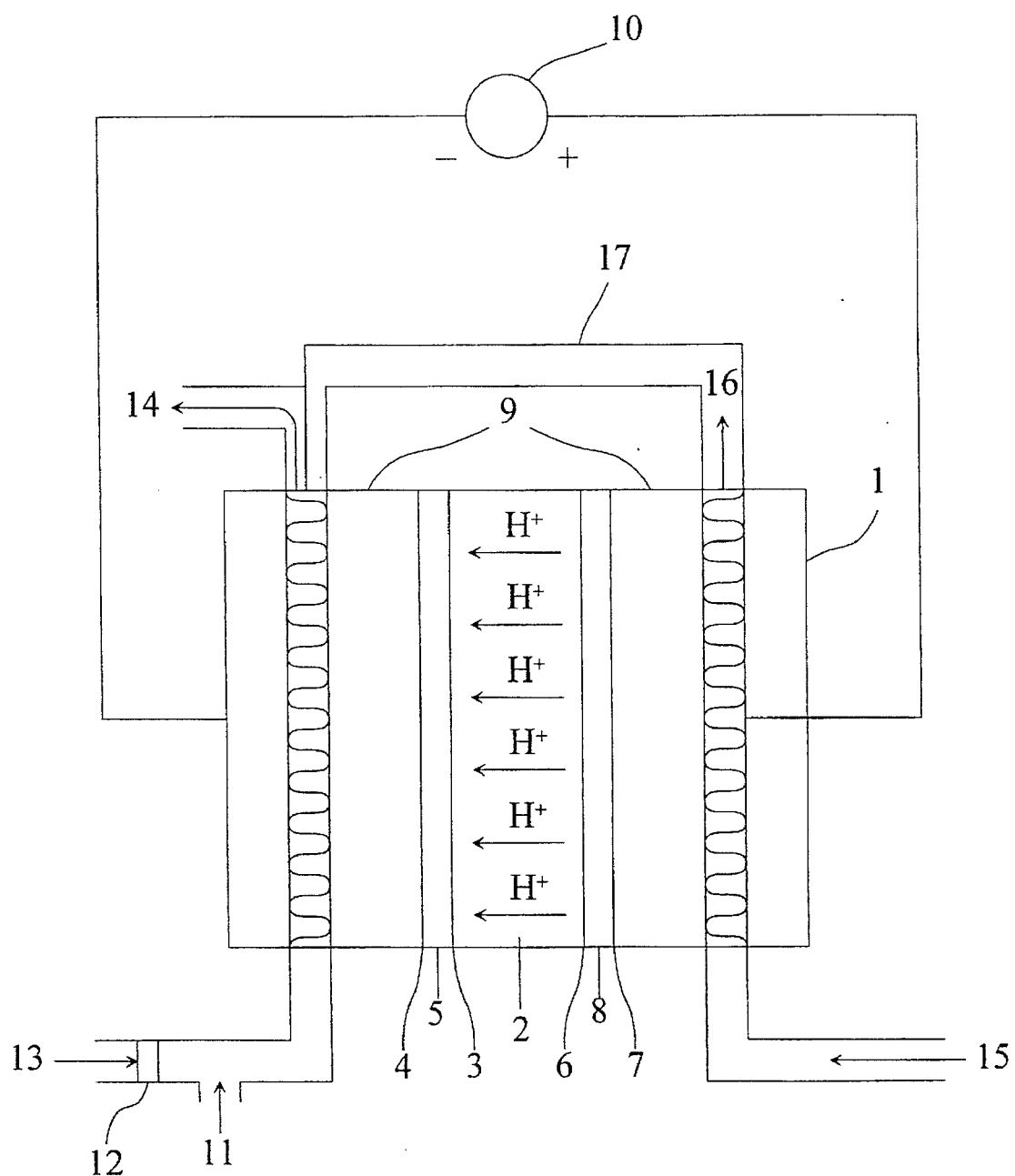
FIG. 1 schematically depicts a single cell configuration of the present invention.
Figure 2:
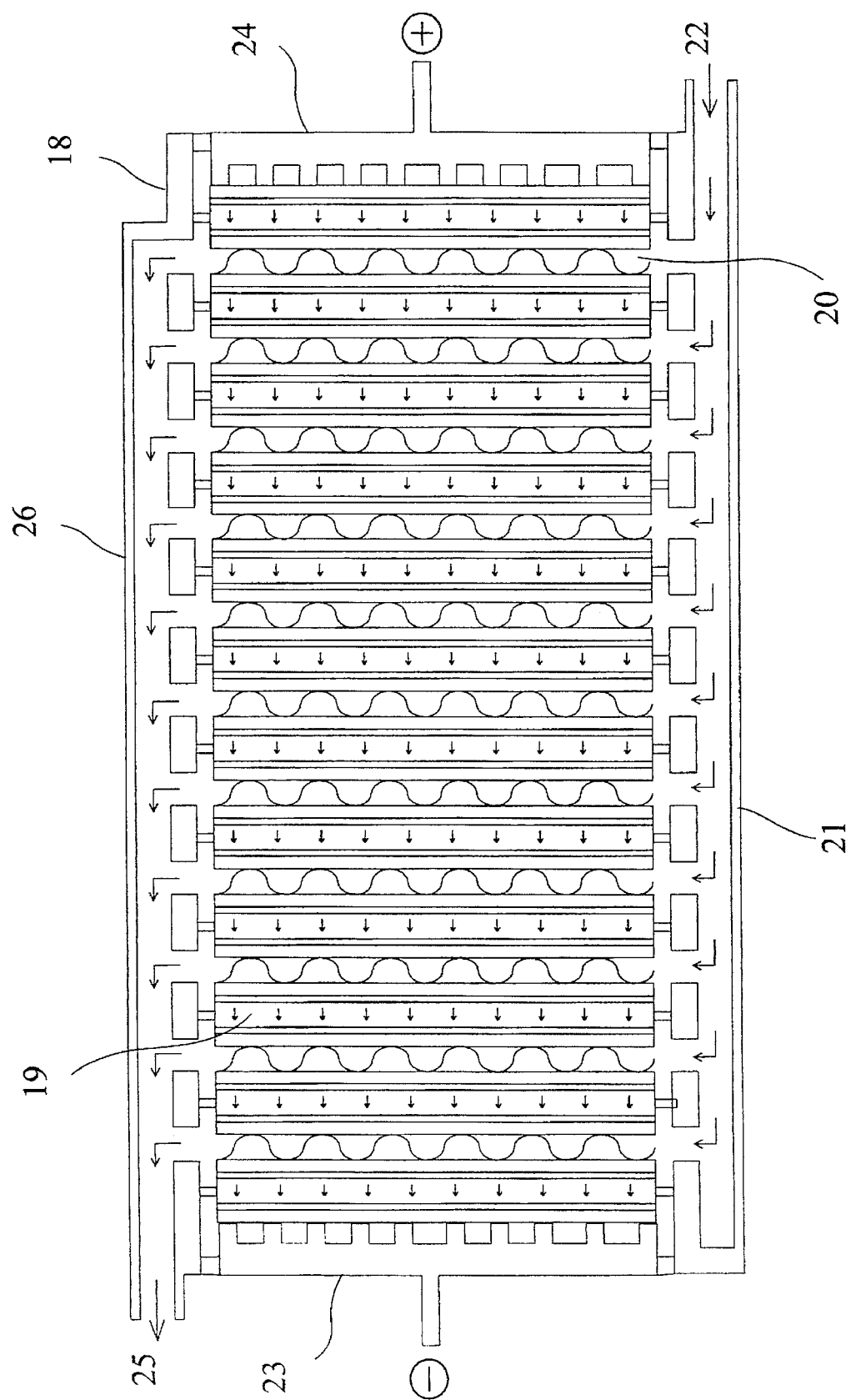
FIG. 2 shows an electrolytic generator consisting of several cells.

Referring now to FIGS. 1 and 2, there is depicted an electrolytic cell 1 containing membrane 2 semipermeable to an anion (negatively charged ion) or cation (positively charged ion). On one face 3 of the membrane, an electrode (cathode) 4 is contacted with the membrane and contains a catalyst 5 for reduction of oxygen to hydrogen peroxide. On the opposite face 6 of the membrane, another electrode (anode) 7 is contacted with the membrane and contains a catalyst 8 for the purpose of the oxidation of water to oxygen or other oxygen-containing species. The cathode and anode are separately contacted with an electrically conductive material 9 connected to a power supply 10 which delivers a controlled current or voltage, to or across the cell. On either side of the cell, liquid is delivered to the cathode and anode. Liquid 11 entering the cathode side contains dissolved oxygen or is emulsified with oxygen by means of a porous metal, ceramic, or glass frit 12 through which oxygen or air 13 is forced into water by means of pressure. Liquid containing hydrogen peroxide 14 is generated upon passage of electrical current such that electrons from the cathode reduce oxygen to hydrogen peroxide in the liquid stream. Liquid (water) 15 on the anode side is delivered into contact with the anode. It is not necessary to introduce gas into this liquid, because the liquid, in combination with ions from the membrane, is oxidized into gaseous oxygen 16 or oxygen containing species. This oxygen may be returned to the cathode side by means of an external conduit 17.

Membrane materials may include proton conductors containing sulfonic acid groups or other acid groups having sufficient acid strength to conduct protons. The exchange arises from the displacement of a proton residing on the acid group by a proton originating from the anode side. These materials may include perfluorosulfonic acid polymers. Membrane materials may also include hydroxide ion conductors containing ammonium or other groups having sufficient basic strength to conduct hydroxide ions. These materials may include anion exchange materials such as Tosflex, Rapore, or Neosepta membranes.

Specific examples of catalysts that may be employed on the reducing side (cathode) of the membrane include C, Platinum Group metals, Group IB metals (Au and Ag), oxides of Platinum Group metals and coordination complexes of Group VIII metals, (Mn, Cr, Fe, Co, Ni, and platinum group metals). In the case of coordination complexes, (a metal center bonded to several electron pair donating ligands), particularly important ligands include porphyrins and phthalocyanines. These ligands fill the coordination sphere of the metal producing completely filled valence d-orbitals. This electronic configuration does not permit the dissociative binding of oxygen to the metal center, but rather, allows the binding of dioxygen to the metal center and its subsequent reduction to peroxide ion or hydrogen peroxide. These metallomacrocycle complexes (metal phthalocyananines or metal prophyrins) may be utilized in their untreated form or may be deposited onto carbon, followed by subsequent pyrolysis (heat treatment), to render the complexes into a metal-containing carbon black.

Several methods for attaching or affixing the cathode electrocatalyst to the membrane are possible. In the first, the electrocatalyst or the electrocatalyst supported on a conductive substrate (carbon powder as graphite, vitreous carbon, or carbon black) is pressed directly onto the polymer membrane by application of heat and pressure. Temperatures of 100°–200° C. and pressures of 100 to 1000 psi may be used. In another method, the electrocatalyst is deposited onto a supporting mesh, screen or porous plate by chemical or electrochemical reduction, or by application of a solution of electrocatalyst followed by drying and chemical reduction (in the case of metals), or by precipitation of the electrocatalyst onto the support (in the case of metal phthalocyanines or metal porphyrins). The supporting sheet containing the electrocatalyst is then pressed onto the polymer membrane under heat and pressure as described before. In a third method, the electrocatalyst (a metal) is chemically reduced directly onto the membrane by the action of a reducing agent (hydrazine or sodium borohydride) on a solution of the corresponding metal ions ($Ag^+$, $AuCL_4^{2-}$, $ptCl_6^{2-}$, $Pd^{2+}$ or $Pd^{4+}$, $Rh^{3+}$ or $Rh^{4+}$, or $IrCl_6^{2-}$) in water, acid, or organic solvents (methanol acetone, acetonitrile) applied directly to one face of the membrane.

Electrocatalyst materials that may be employed on the anode side of the membrane include $RuO_2$, $TiO_2$, platinum group metals, Au, transition metal oxides, and compound metal oxides containing Group VIII metal ions. The catalyst material in either electrode cathode or anode) may be deposited directly onto the membrane or supported on a screen or mesh of carbon, carbon paper, glass carbon sponges, oxidatively resistant metal, or conductive ceramic. Methods of application are identical to those for cathode electrocatalysts.

Electrical contact is made to the electrocatalysts on either face of the membrane by means of a conductive material that includes carbon in the form of cloth, paper, vitreous carbon sponge, or porous plate and metals including stainless steel or other acid and hydrogen peroxide resistant alloys pretreated in hydrogen peroxide to create a passive film of chemically resistant oxide. The current collector contacts the cathode either by acting as a support for cathode or cathode electrocatalyst already in contact with the polymer membrane.

Membrane materials may include cation (proton) conductors such as Nafion, or anion ($OH^-$) conductors such as Tosflex, Raipore, or Neosepta membranes.

SPECIFIC EXAMPLE OF THE INVENTION

In order to generate larger quantities of hydrogen peroxide at higher rates than is possible using a single electrolytic cell, it is necessary to electrically connect several single electrolytic cells. In this case, a device 18 is constructed, consisting of units of single cells 19 connected with electronically conductive elements 20 which also serve to separate cells. A conduit 21 is used to deliver liquid 22 such as water containing dissolved oxygen or as an emulsion with oxygen to and from each individual cell. At one end of this assembly, a current collector plate 23 makes contact with the cathode of one of the cells which further makes contact with another cell in a series connection. This electrical contact between cathode and anode continues until the anode at the opposite end of the assembly electrically contacts another current collector plate 24. The passage of electrical current in such a direction as to cause of the reduction of oxygen on the cathode side of each cell results in the generation of hydrogen peroxide 25 in the liquid stream entering the cathode side of each cell. This hydrogen peroxide containing liquid 25 is subsequently removed through a conduit 26 connected to each cell.

We claim:

1. A hydrogen peroxide generator device comprising a multiplicity of electrolytic adjacent cells for generating hydrogen peroxide in a stream of water, each cell comprising:

a cathode containing a catalyst for the reduction of oxygen;

an anode containing a catalyst for the oxidation of water;

a polymer membrane, semipermeable to protons and having a first face interfacing to said cathode and a second face interfacing to said anode so that when a stream of water containing dissolved oxygen, oxygen bubbles, or emulsified oxygen is passed over the cathode and a stream of water is passed over the anode and an electric current is passed between the anode and the cathode, hydrogen peroxide is generated at the cathode and oxygen is generated at the anode;

means for delivering a stream of water containing oxygen to and from each of said cells wherein the water containing hydrogen peroxide exiting the cathode of each cell mingles with water containing oxygen supplied to the anode of the adjacent cell; and means for electrically connecting said cells and passing an electrical current through the cells so that oxygen is reduced adjacent to the cathode of each cell, resulting in the generation of hydrogen peroxide in the water stream.

2. A device for generating hydrogen peroxide as claimed in claim 1, wherein:

said membrane is fabricated of materials selected from the group consisting of proton conductors containing sulfonic acid groups or other acid groups having sufficient acid strength to conduct protons.

3. A device for generating hydrogen peroxide as claimed in claim 1, wherein:

said membrane is fabricated of materials selected from the group consisting of perfluorosulfonic acid polymers.

4. A hydrogen peroxide generator device comprising a multiplicity of electrolytic adjacent cells for generating hydrogen peroxide in a stream of water, each cell comprising:

a cathode containing a catalyst for the reduction of oxygen;

an anode containing a catalyst for the oxidation of hydroxide ions;

a polymer membrane, semipermeable to hydroxide ions and having a first face interfacing to said cathode and a second face interfacing to said anode so that when a stream of water containing dissolved oxygen, oxygen bubbles, or emulsified oxygen is passed over the cathode, hydrogen peroxide is generated at the cathode and oxygen is generated at the anode;

means for delivering said stream of oxygen-containing water to and from each of said cells wherein the water containing hydrogen peroxide exiting the cathode of each cell mingles with water containing oxygen supplied to the anode of the adjacent cell; and means for electrically connecting said cells and passing an electrical current through the cells so that oxygen is reduced adjacent to the cathode of each cell resulting in the generation of hydrogen peroxide in the water stream.

5. A device for generating hydrogen peroxide of claim 1 or 4, wherein:

the material of said reduction catalyst is selected from the group consisting of carbon, platinum group metals, group IB metal, oxides of platinum group metals, and coordination complexes of group VIII metals.

6. A device for generating hydrogen peroxide of claim 1 or 4, wherein:

the material of said oxidation catalyst is selected from the group consisting of $RuO_2$, $TiO_2$, platinum group metals, Au, transition metal oxides, and compound metal oxides containing group VIII metal ions.

7. A device for generating hydrogen as claimed in claim 4, wherein:

said membrane is fabricated of materials selected from the group consisting of hydroxide ion conductors containing ammonium groups or other groups having basic strength to conduct hydroxide ions.

8. A device according to claims 1 or 4 wherein the material of said reduction catalyst is a metallomacrocycle coordination complex of a group VIII metal.

9. A method for generating hydrogen peroxide in a water stream comprising the steps of:

providing a device for generating hydrogen peroxide comprising a multiplicity of adjacent electrolytic cells according to any of claims 1, 3–7, 10 or 11;

delivering a stream of water containing oxygen to said device such that said oxygen-containing water is supplied to the anode of each of said cells, such that water containing hydrogen peroxide exiting the cathode of a cell mingles with oxygen-containing water supplied to the anode of the adjacent cell and such that water containing hydrogen peroxide can exit the device;

passing an electrical current through the cells of said device so that oxygen is reduced adjacent to the cathode of each cell, resulting in the generation of hydrogen peroxide in a water stream exiting said device.

* * * * *

UNITED STATES PATENT AND TRADEMARK OFFICE
CERTIFICATE OF CORRECTION

PATENT NO. : 5,645,700

DATED : Jul. 8, 1997

INVENTOR(S) : White et al.

It is certified that error appears in the above-identified patent and that said Letters Patent is hereby corrected as shown below:

At column 2, line 34, please delete the entire third full paragraph beginning "U.S. Pat. No. 4,455,203" and ending "peroxide is supplied."

At column 6, line 64, please rewrite "$ptCl_6^{2-}$" as --$PtCl_6^{2-}$--.

At column 9, line 3, please rewrite "1, 3-7, 10 or 11" as --1-8--.

Signed and Sealed this

Twenty-third Day of December, 1997

Attest:

BRUCE LEHMAN

*Attesting Officer*  *Commissioner of Patents and Trademarks*